United States Patent
Funck

(10) Patent No.: US 9,719,822 B2
(45) Date of Patent: Aug. 1, 2017

(54) METHOD OF ULTRASONIC FLOW MEASUREMENT AND DEVICE FOR THE IMPLEMENTATION OF THE METHOD

(75) Inventor: Bernhard Funck, Rostock (DE)

(73) Assignee: FLEXIM Flexible Industriemesstechnik GmbH, Berlin (DE)

( * ) Notice: Subject to any disclaimer, the term of this patent is extended or adjusted under 35 U.S.C. 154(b) by 807 days.

(21) Appl. No.: 14/003,165

(22) PCT Filed: Mar. 7, 2012

(86) PCT No.: PCT/EP2012/053909
§ 371 (c)(1),
(2), (4) Date: Sep. 4, 2013

(87) PCT Pub. No.: WO2012/120039
PCT Pub. Date: Sep. 13, 2012

(65) Prior Publication Data
US 2014/0000339 A1    Jan. 2, 2014

(30) Foreign Application Priority Data
Mar. 7, 2011 (DE) .......................... 10 2011 005 170

(51) Int. Cl.
*G01F 1/66* (2006.01)
*G01F 25/00* (2006.01)

(52) U.S. Cl.
CPC ................ *G01F 1/66* (2013.01); *G01F 1/662* (2013.01); *G01F 1/667* (2013.01); *G01F 1/668* (2013.01); *G01F 25/0007* (2013.01)

(58) Field of Classification Search
CPC .................................... G01F 1/66; G01F 1/667
USPC ....................... 73/1.16, 1.34, 861.27–861.32
See application file for complete search history.

(56) References Cited

U.S. PATENT DOCUMENTS

| | | | |
|---|---|---|---|
| 3,230,766 A * | 1/1966 | Kalimann | G01F 1/66 73/861.26 |
| 5,856,622 A | 1/1999 | Yamamoto | |
| 7,506,532 B2 | 3/2009 | Funck et al. | |
| 2008/0216555 A1* | 9/2008 | Funck | G01F 1/66 73/1.16 |
| 2010/0319464 A1* | 12/2010 | Bessyo | G01F 1/667 73/861.28 |
| 2011/0094309 A1 | 4/2011 | Berger et al. | |
| 2011/0231137 A1 | 9/2011 | Funck et al. | |

FOREIGN PATENT DOCUMENTS

| | | |
|---|---|---|
| DE | 198 08 642 | 8/1999 |
| DE | 102 21 771 | 11/2003 |
| DE | 103 12 034 | 3/2004 |

(Continued)

*Primary Examiner* — Daniel S Larkin
*Assistant Examiner* — Anthony W Megna Fuentes
(74) *Attorney, Agent, or Firm* — Muncy, Geissler, Olds & Lowe, P.C.

(57) ABSTRACT

A method of ultrasonic clamp-on flow measurement according to the transit time difference method and apparatus for the implementation of the method, wherein the electromechanical transducer element of at least one of the two acoustic transducers is comprised of at least two array elements and a correction factor is determined by comparing the transit times between the acoustic transducers while using different array elements.

7 Claims, 5 Drawing Sheets

(56) References Cited

FOREIGN PATENT DOCUMENTS

| | | |
|---|---|---|
| DE | 10 2004 031 274 | 12/2006 |
| DE | 10 2008 029 772 | 12/2009 |
| DE | 10 2009 046 871 | 6/2010 |
| EP | 0 733 885 | 9/1996 |

* cited by examiner

METHOD OF ULTRASONIC FLOW MEASUREMENT AND DEVICE FOR THE IMPLEMENTATION OF THE METHOD

BACKGROUND OF THE INVENTION

Clamp-on flow meters are widely used in numerous industrial sectors. One of their major advantages is the fact that the flow measurement takes place without any contact with the flowing fluid.

The acoustic transducers used for the clamp-on flow measurement consist of a transducer wedge and a thereon mounted electromechanical acoustic transducer element, hereinafter referred to as transducer element, which is generally realized using a piezoceramic element. The acoustic transducers are mounted on the outside of the pipe in which the flow rate is to be measured. Hereinafter, the pipe is referred to as measuring pipe. The acoustic transducers are positioned in such way that an ultrasonic signal can be sent through the measuring pipe by one acoustic transducer to the other acoustic transducer and the acoustic beam in the flowing fluid has an angle smaller than 90 in relation to the pipe axis. Clamp-on flow meters according to the transit-time difference method measure the difference of the transit times of the two acoustic signals that propagate in and against the flow direction and use the transit time difference to calculate the volumetric flow rate. The relationship between the measured transit times and the flow velocity is described, for example, in WO 8808516 A1. The line-averaged flow velocity Vl along the sound path can be calculated from the transit time difference $\Delta t$ and the transit time t1 in the fluid according to the following equation:

$$Vl = Ka * (\Delta t / 2t1) \quad \text{Eq. (1)}$$

Therein, Ka is the transducer constant that determines the angle of incidence in the fluid:

$$Ka = c\_alpha / \sin(alpha) \quad \text{Eq. (2)}$$

Here, alpha and c_alpha correspond to the angle of incidence and the sound speed in the transducer wedge, respectively. In order to calculate the volumetric flow rate, the fluidmechanical calibration factor KF, which describes the ratio of the area-averaged flow velocity and the line-averaged flow velocity along the sound path, has to be known:

$$KF = VA / Vl \quad \text{Eq. (3)}$$

Therefore, the volumetric flow rate Q is calculated from the cross-section area A of the pipe as $$Q = KF * A * Ka * (\Delta t / 2t1) \quad \text{Eq. (4)}$$

One advantageous embodiment of the ultrasonic clamp-on flow measurement is described, for example, in DE19808642. Due to the design of the cross-section area of the pipe, the fluidmechanical calibration factor KF is designed in such way that it is independent of the condition of the flow. In DE10312034B3, an ultrasonic flow measurement method is described which allows a particularly precise determination of the fluid transit time t1 by measuring consecutive ultrasonic signals which pass through the measuring pipe multiple times.

EP0733885A1 describes a method for ultrasonic clamp-on flowmeters of compensating for the pressure and temperature dependence of the fluid by determining the sound speed of the fluid and adjusting the sound path within the fluid according to the law of refraction. The sound speeds of the transducer wedge and the pipe wall with their temperature dependences are assumed as known.

DE102009046871A1 describes a method of calibrating the transmitter of an ultrasonic clamp-on flowmeter. This allows a calibration of the time measurement required according to Eq. 1 which is independent of the acoustic properties of the measuring pipe and the acoustic transducers. Using this method, the transducer constant Ka is assumed as known and invariable.

In principle, it is assumed that the angle of incidence in the fluid is determined according to the law of refraction from the transducer constant Ka and the sound speed in the fluid. However, the wall of the measuring pipe can lead to a non-negligible deviation from sound propagation according to the law of refraction. Measurements have shown that, in that case, the transducer constant Ka used in Eq. (1) does not exactly represent the ratio of the flow velocity Vl and the transit time difference $\Delta t$ as well as the transit time t1 instead of the transducer constant Ka calculated from the parameters of the acoustic transducer in Eq. (2), it would be necessary to use a factor containing the influence of the pipe wall in Eq. (1). This factor could generally be called acoustic calibration factor. Ideally, when there is no influence of the pipe wall, it would be identical with Ka; usually, however, it deviates more or less strongly from Ka. Because the pipe wall does not influence the sound speed in the transducer wedge, this deviation can only be interpreted as a change of the angle of incidence alpha.

A major advantage of the clamp-on flow measurement is the fact that the acoustic transducers can be installed on a pipe already present at the measuring point. If this advantage is to be utilized, the flowmeter cannot be calibrated at the manufacturing site together with the measuring pipe. Therefore, a possible influence of the measuring pipe on the acoustic calibration factor has to be compensated for after the installation of the acoustic transducers at the measuring point on the measuring pipe. For this, it is necessary to quantify this influence, i.e., to determine the acoustic calibration factor mentioned previously. The determination of a calibration factor for a flowmeter which is already located at the measuring point is called field calibration. In the process, the value displayed by the flowmeter is compared with the value displayed by a reference flowmeter. Usually, however, there is no reference flowmeter present at the measuring point. Therefore, it is preferable to determine the acoustic calibration factor without relying on a reference flowmeter.

The method described in DE 102004031274 B4 is, in principle, suited for this objective. However, due to the necessary mutual translation of the acoustic transducers, this method requires substantial effort if the method is to be applied at the measuring point instead of in a calibration laboratory.

DE 10221771 A1 shows an acoustic transducer for an ultrasonic flowmeter with multiple piezo elements which are combined to form a piezo array. Generally, an array is a number of transducer elements arranged in a plane, where the transducer elements can be triggered independently and, when combined, also form a transducer element. The transducer elements which form the array are called array elements. In the case of a piezo array, the array elements are piezo elements. Therefore, it is possible, by using an acoustic transducer attached flatly to the measuring pipe wall, to achieve different angles of incidence into the measured fluid for the ultrasonic signal with one wave front in relation to the measuring pipe axis. However, delayed triggering requires a lot of computational power. Furthermore, the change of angle is only possible within a limited range. If the angle of incidence of the ultrasonic signal is very flat, longitudinal waves can be excited, which can lead to a decrease in the transmission through the pipe wall and to the reflection of a significant part of the sound wave.

DE 102008029772 A1 describes a measuring system and a method for determining and/or monitoring the flow rate of a measured fluid in a measuring pipe using a first acoustic transducer and at least a second acoustic transducer. The second acoustic transducer is equipped with at least two transducer elements. The signals obtained during a diagnosis phase are used to select the transducer elements of the second acoustic transducer to be used during the measurement phase. By doing this, it is possible, for example, to reduce the effect of a sound speed change that might occur after the installation. A field calibration is not possible with this method.

SUMMARY OF THE INVENTION

The invention is based on the objective of creating a clamp-on flow measurement method and a device for implementing the method which compensates for the deviation of the acoustic calibration factor caused by the measuring pipe, which does not rely on a reference flowmeter and during which the acoustic transducers can remain in their installation position on the measuring pipe.

According to the invention, this objective is accomplished by a method of ultrasonic clamp-on flow measurement using two acoustic transducers with transducer elements which are installed on a measuring pipe, where at least one transducer element includes at least two array elements, characterized in that during an analysis phase consisting of the following steps a. measurement of a transit time t1 between a transducer element (3) of the first acoustic transducer (1) and a first array element (4a) of the second acoustic transducer (2), b. measurement of a transit time t2 between a transducer element (3) of the first acoustic transducer (1) and a second array element (4b) of the second acoustic transducer (2), c. calculation of a time difference delta_tc between the transit times t1 and t2, a calibration factor Kaf is determined using the calculated time difference delta_tc and used during the subsequent operating phase for the measurement of a volumetric flow rate Q in order to compensate for the acoustic influence of the measuring pipe.

An alternative solution consists in a method of ultrasonic clamp-on flow measurement using two acoustic transducers with transducer elements which are installed on a measuring pipe where at least one transducer element includes at least two array elements and is characterized in that, during an analysis phase, a cross-correlation function of at least two received signals (s1) and (s2) is calculated, where the received signal (s1) is the signal emitted by the transducer element (3) of the first acoustic transducer (1) and received and digitized by the array element (4a) of the second acoustic transducer (2), and the received signal (s2) is the signal emitted by the transducer element (3) of the first acoustic transducer (1) and received and digitized by the array element (4b) of the second acoustic transducer (2), the temporal position of the maximum of the cross-correlation function is calculated, where this temporal position is the time difference delta_tc and a calibration factor Kaf is determined using the calculated time difference delta_tc and is used during the subsequent operating phase for the measurement of a volumetric flow rate Q in order to compensate for the acoustic influence of the measuring pipe.

A calculation of a path length difference delta_lc is carried out based on the time difference delta_tc, where a known sound speed ca in the transducer wedge is multiplied by the time difference delta_tc, resulting in an angle change delta_alpha with arcsin(delta_lc/delta_s), where delta_s is the mutual distance of the array elements (4a) and (4b), from which the calibration factor Kaf is calculated as ca/sin (alpha+delta_alpha).

The calibration factor Kaf is calculated on the basis of the time difference delta_tc according to the equation Kaf=Ka/ (1+Ka*cos(alpha)*delta_tc/delta_s), where Ka is the ratio of the sound speed ca in the transducer wedge and the sine of the angle of incidence alpha in the transducer wedge and delta_s is the mutual distance between the array elements (4a) and (4b).

Alternatively, the calibration factor Kaf is calculated from the time difference delta_tc using an approximation function fc(delta_tc), where the approximation function fc(delta_tc) is calculated from a number N of value pairs (Kaf_i, delta_tc_i), where the value pairs (Kaf_i, delta_tc_i) are obtained before the measurement by measuring Kaf_i and delta_tc_i on each of a number N of pipes i, on which the acoustic transducers are installed in the way customary to the ultrasonic clamp-on flow measurement, where the measurement of Kaf_i is carried out by measuring the transit times tx1 and tx2, while the acoustic transducer (2) is located at the position x1 or x2, where the transit times are the transit times between a transducer element (3) of the first acoustic transducer (1) and a transducer element (4) of the second acoustic transducer (2), where the points x1 and x2 lie symmetrically with respect to a point x0, and Kaf_i is calculated as Kafxi=(x2−x1)/(tx2−tx1), and the measurement of delta_tc_i is carried out according to steps a through c according to claim 1, while the acoustic transducer (2) is located at the position x0.

The method can be implemented in a clamp-on flowmeter.

The device for the implementation of the method includes an emitting unit, at least one array multiplexer with at least 2 inputs, a direction switch, a receiving amplifier, a processing unit and a control unit and a calculation unit and is characterized in that the array multiplexer connects either an array element 4a or an array element 4b or both array elements to a receiving amplifier and the control unit controls the direction switch as well as the array multiplexer and the processing unit, which determines the time difference delta_tc, and the calculation unit, which determines the calibration factor Kaf from the time difference delta_tc and uses it during the operating phase.

The processing unit includes an analog-to-digital converter, a buffer memory and a digital correlator. In one design variation, the correlator is realized by using a programmable digital signal processor.

Alternatively, the processing unit includes a time measuring unit, a buffer memory and a difference generator.

An advantage of the method and the device for the implementation of the method is the fact that the flowmeter can be calibrated without a reference volumetric flow rate. The acoustic transducers can remain in their installation position.

BRIEF DESCRIPTION OF THE DRAWINGS

In the following, the design examples of the invention are explained in detail with the help of the illustrations. The figures show the following.

DETAILED DESCRIPTION OF THE INVENTION

Figure 1:
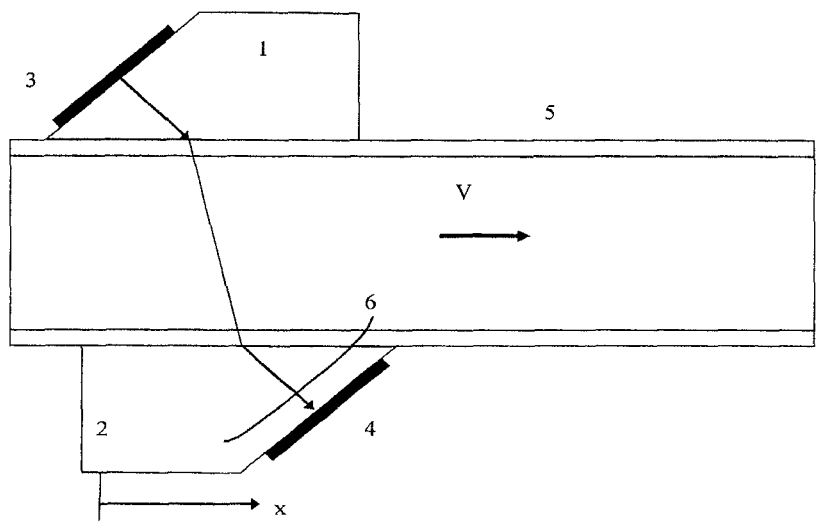
FIG. 1: acoustic transducer arrangement on the measuring pipe.

The arrangement shown in FIG. 1 has the two acoustic transducers 1 and 2 with the transducer elements 3 and 4 and the measuring pipe 5. If the emitting surface of the transducer elements is sufficiently large in relation to the wavelength, the sound propagates approximately as a plane wave. FIG. 1 shows such a plane wave front 6. The measuring pipe is assumed to be axisymmetrical with regard to its geometry and material properties. Therefore, the pipe wall limits shown in the sectional plane in FIG. 1 are parallel to each other. Therefore, if a wave is emitted by the acoustic transducer 1 and propagates through the pipe to the acoustic transducer 2, the angles of incidence in both transducer wedges are equal. This means that a wave front emitted by the transducer element 3 is parallel to the transducer element 4. The pipe wall's filter effect can lead to deviations from this ideal behavior. This causes a change in the direction of propagation of the wave when it transits the pipe wall, which manifests itself in the fact that the wave front does not arrive exactly parallel to the transducer element 4, which receives the sound wave.

The idea behind the invention is to measure this deviation from parallelism of the wave front to the transducer element of the acoustic transducer receiving the sound wave from the transit time differences which occur along the geometry of the receiving transducer element. In order to achieve that, it is suggested to design the transducer element of at least one of the two acoustic transducers as an array consisting of at least two array elements.

Figure 2:
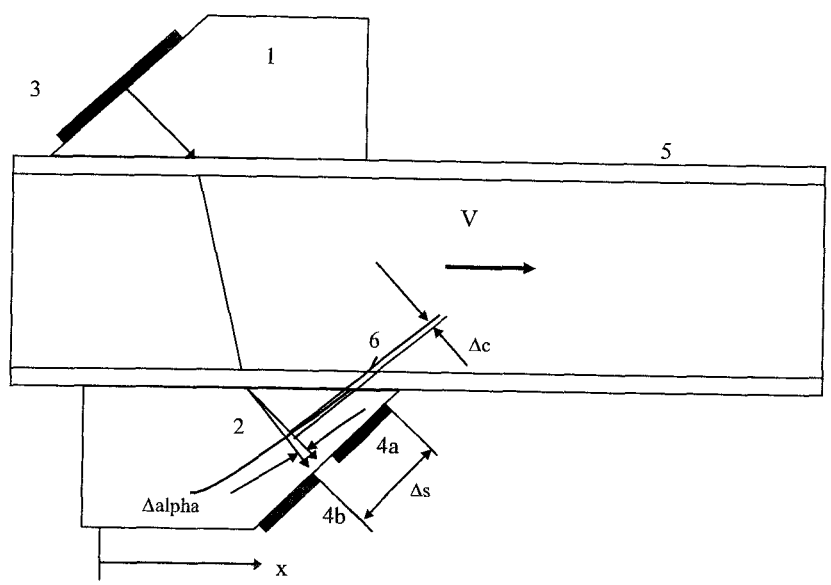
FIG. 2: acoustic transducer arrangement on the measuring pipe, where the transducer element of the acoustic transducer 2 is realized as an array.

FIG. 2 shows such an arrangement. It differs from the arrangement shown in FIG. 1 in that the transducer element of the acoustic transducer 2 is designed as an array with the array elements 4a and 4b. In this example, the direction of propagation of the wave front 6 is changed by the measuring pipe in such way that it does not arrive parallel to the transducer element of the acoustic transducer 2. In order to illustrate the effect, the drawing of the change of the angle is exaggerated. The effect is usually so small that it would not be visible in FIG. 2. The transit time t1 between the transducer element 3 of the first acoustic transducer 1 and the array element 4a of a second acoustic transducer 2 as well as the transit time t2 between the transducer element 3 of the first acoustic transducer 1 and the array element 4b of the second acoustic transducer 2 are measured. The deviation of the wave front from parallelism with the receiving transducer element manifests itself as a time difference delta_tc between these two transit times:

$$\mathrm{delta\_}tc = t2 - t1 \quad \text{Eq. (5)}$$

During an analysis phase, the two transit times t1 and t2 are therefore measured and the time difference delta_tc is calculated to obtain a measured value of the time difference delta_tc. The measured value of the time difference is used to determine a calibration factor Kaf. During the subsequent operating phase, the flow measurement is carried out. The calibration factor determined during the analysis phase is used to compensate for the acoustic influence of the measuring pipe. To achieve this, the transducer constant Ka in Eq. (4) is replaced by Kaf.

During the operating phase, the two array elements 4a and 4b of the transducer element 4 are electrically connected in parallel. Preferably, the two combined array elements of the transducer element 4 form a transducer element of the same size as the transducer element 3. Due to the parallel connection, the transducer element 4 has about the same acoustic properties as the transducer element 3.

One advantageous embodiment of the invention is obtained by determining the time difference delta_tc directly from the received signals without a previous measurement of the transit times t1 and t2. To achieve this, the cross correlation function of the received signals s1 and s2 is calculated, where s1 is the signal emitted by the transducer element 3 of the first acoustic transducer 1 and received and digitized by the array element 4a of the second acoustic transducer 2, and s2 is the signal emitted by the transducer element 3 of the first acoustic transducer 1 and received and digitized by the array element 4b of the second acoustic transducer 2. If the two signals s1 and s2 have the same transit time, the maximum of the cross-correlation function over time is at the point t=0. A difference of the transit times of the two signals manifests itself in a displacement of the maximum of the cross-correlation function by exactly this difference. The time difference delta_tc can therefore be determined by determining the maximum of the cross-correlation function of the signals s1 and s2.

Another advantageous embodiment of the invention is described in the following. The path length difference delta_tc is calculated as the time difference delta_tc multiplied by the sound speed ca in the transducer wedge.

$$\mathrm{Delta\_}tc = ca * \mathrm{delta\_}tc \quad \text{Eq. (6)}$$

The sound speed ca in the transducer wedge can be assumed as known. The change of the angle delta_alpha is therefore $$\mathrm{Delta\_alpha} = \arcsin(\mathrm{delta\_}lc/\mathrm{delta\_}s) \quad \text{Eq. (7)}$$

Here, delta_s is the distance between the array elements as defined in FIG. 2. The acoustic calibration factor Kaf of the installed acoustic transducers is calculated in Eq. (2) by adding the change of the angle delta_alpha to the angle alpha:

$$Kaf = ca/\sin(\mathrm{alpha} + \mathrm{delta\_alpha}) \quad \text{Eq. (8)}$$

Another possible embodiment of the invention results from the fact that the equation for the calculation of the calibration factor Kaf on the basis of the time difference delta_tc is derived from the following considerations.

Figure 3:
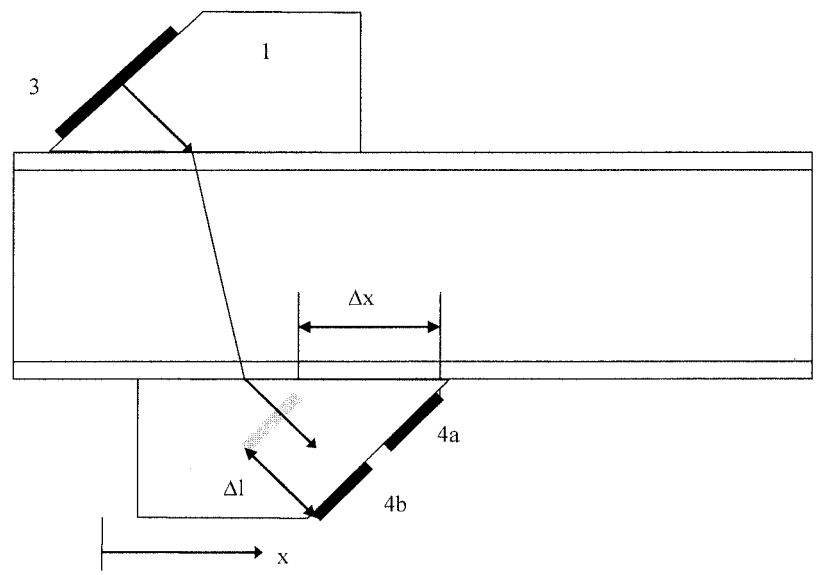
FIG. 3: acoustic transducer arrangement on the measuring pipe, where the transducer element of the acoustic transducer 2 is realized as an array.

The imagined displacement of the array element 4a by the distance delta_x as shown in FIG. 3 causes a transit time difference of the propagation of sound between the transducer element 3 and the array element 4a by the value delta_tx. As shown in DE 102004031274 B4, the ratio of delta_x and delta_tx is precisely the acoustic calibration factor. If the acoustic transducer was actually displaced on the pipe, it would be possible to determine the acoustic calibration factor Kafx, which includes the possible effects of the pipe wall:

$$Kafx = \text{delta\_x}/\text{delta\_tx} \quad \text{Eq. (9)}$$

In order to avoid the physical displacement, the transit time t2 is instead measured and used to calculate the transit time t20 between the transducer element 3 and the array element 4 at the imagined position. The transit time t20 is obtained by from t2 by subtracting the transit time ta along the distance delta_l through the transducer wedge.

$$t20 = t2 - ta \quad \text{Eq. (10)}$$

Therefore, the time difference delta_tx is according to Eq. (5):

$$\text{delta\_tx} = t1 - t20 = t1 - (t2 - ta) = \text{delta\_tc} + ta \quad \text{Eq. (11)}$$

Therefore, Eq. (9) yields $$Kafx = \text{delta\_x}/(\text{delta\_tc} + ta) \quad \text{Eq. (12)}$$

The transit time ta results from the distance delta_l and the sound speed ca in the transducer wedge as $$ta = \text{delta\_l}/ca \quad \text{Eq. (13)}$$

Delta_l, delta_s and delta_x form a right triangle. Therefore, delta_x can be replaced by delta_s using the angle alpha. Therefore:

$$\text{delta\_x} = \text{delta\_s}/\cos(\text{alpha}) \quad \text{Eq. (14)}$$

In Eq. (13), delta_l is replaced by the product of tan(alpha) and delta_s:

$$ta = \tan(\text{alpha}) \cdot \text{delta\_s}/ca. \quad \text{Eq. (15)}$$

Inserting Eq. (14) and Eq. (15) in Eq. (12) yields:

$$Kafx = \text{delta\_s}/(\cos(\text{alpha})(\text{delta\_tc} + \tan(\text{alpha}) \cdot \text{delta\_s}/ca)) \quad \text{Eq. (16)}$$

With Ka according to Eq. (2), Eq. (16) can be simplified to $$Kafx = Ka/(1 + Ka \cdot \cos(\text{alpha}) \cdot \text{delta\_tc}/\text{delta\_s}) \quad \text{Eq. (17)}$$

Therefore, the measurement of the calibration factor Kafx according to Eq. (17) replaces the spatial displacement delta_x with an equivalent measurement of the time difference delta_tc using the parameters of the acoustic transducer. Therefore, Eq. (17) provides a formula for determining the calibration factor Kaf:

$$Kaf = Ka/(1 + Ka \cdot \cos(\text{alpha}) \cdot \text{delta\_tc}/\text{delta\_s}) \quad \text{Eq. (18)}$$

Eq. (8) and Eq. (18) are alternative ways to describe the calibration factor Kaf. The difference between Kaf and the transducer constant Ka, which results only from the properties of the transducer, is caused by the effect of the pipe wall. A special case is where there is no pipe wall influence at all, meaning that delta_tc=0. In this case, Eq. (8) and Eq. (18) yield Kaf=Ka.

Eq. (8) yields the same result as Eq. (18). Namely, Eq. (8) can be converted to Eq. (18) by approximating sin(alpha+delta_alpha) using the first term of the Taylor series and substituting arcsin(delta_lc/delta_s) with the argument delta_lc/delta_s.

Another possible embodiment of the invention is obtained by experimentally determining the relationship between the time difference delta_tc and the calibration factor Kaf. By doing this, Kaf can be determined using the method described in DE 102004031274 B4. This method is applied in a laboratory to a sufficient choice of measuring pipes which are possible in practical applications. For this, the acoustic transducers are positioned on pipe 5 as shown in Error! Reference source not found. Then, the transit times tx1 and tx2 at the positions x1 and x2 of the acoustic transducer 2 are measured, where the points x1 and x2 lie symmetrically with respect to a point x0. The transit times tx1 and tx2 are the transit times between the transducer element 3 of the acoustic transducer 1 and the transducer element 4 of the acoustic transducer 2. The two array elements 4a and 4b of the transducer element 4 are electrically connected in parallel.

As described in DE 102004031274 B4, the calibration factor Kaf, which already contains the influence of the pipe wall, is calculated as $$Kaf = (x2 - x1)/(tx2 - tx1). \quad \text{Eq. (19)}$$

Afterwards, the acoustic transducer 2 is placed at position x0 and the time difference delta_tc is measured. This yields a value pair Kaf_i and delta_tc_i for the pipe i used in the experiment. The experiment is repeated for a number N of additional pipe segments which are selected in such way that the extent of their influence on the calibration factor varies. This yields a number N of value pairs (Kaf_i, delta_tc_i). Applying a common method, these value pairs are used to calculate an approximation function fc(delta_tc) suitable to approximate Kaf from delta_tc.

During the operating phase, this can be used to calculate the calibration factor Kaf from the measured value delta_tc:

$$Kaf = fc(\text{delta\_tc}) \quad \text{Eq. (20)}$$

The function fc serves to cover as much as possible of the variation range of Kaf which can occur in practice. To achieve this, the variation range of the properties of the pipes used in the experiment has to correspond to that of the pipes present in the practical application of the flowmeter. For example, if the acoustic transducers are suitable for steel and stainless steel pipes with pipe wall thicknesses between 4 and 8 mm, one possibility would be to conduct the experiment on pipes with the pipe wall thicknesses 4, 6 and 8 mm for both steel and stainless steel. The data base can be extended by conducting the experiment using different steel or stainless steel grades with varying elastic properties.

One advantageous embodiment of the invention results from the fact that the transducer element 4 shown in FIG. 2 does not consist of two but four array elements. Therein, two non-adjacent array elements can be connected in parallel. The value delta_x decreases to one fourth of the total width of the array. Each of the transducer elements created by this interconnection has ¾ of the width of the array, meaning that the area representing its aperture is also ¾ of the interconnection of all array elements of the array used for the flow measurement.

The number of array elements can be continued in the manner described. With the increasing number of array elements, the transducer element used during the analysis phase becomes more similar to the interconnection of all array elements used for the flow measurement. On the other hand, the time difference delta_tc, which causes a certain deviation of the angle of the wave front decreases, meaning that it can be measured less exactly.

Figure 4:
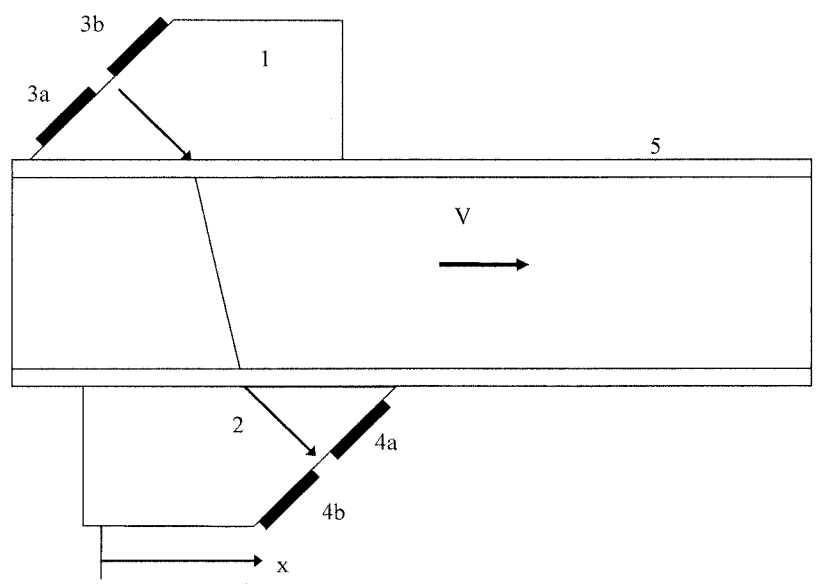
FIG. 4: acoustic transducer arrangement on a measuring pipe, Error! Reference source not found.: acoustic transducer arrangement on the measuring pipe, where the transducer element of both acoustic transducers is realized as an array, FIG. 6 circuit arrangement for the implementation of the method, FIG. 7 processing unit, FIG. 8 another design variation of the processing unit, FIG. 9 other designs of the acoustic transducer as an array with another array multiplexer.
Figure 5:
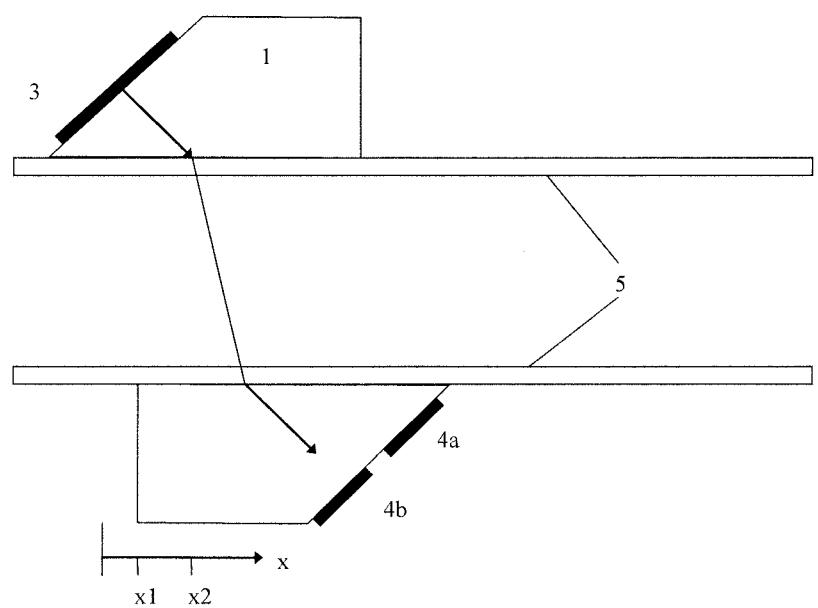

The properties of the two acoustic transducers used in a flow measurement arrangement according to the time difference principle should be as similar as possible in order to minimize the zero offset error. One advantageous embodiment of the invention results from the fact that, during the operating phase, the two array elements 4a and 4b are connected in parallel and, by doing this, the size of the transducer element of the acoustic transducer 2 is made largely identical to that of the acoustic transducer 1. Furthermore, it is possible to realize the transducer element 3 of the acoustic transducer 1 as an array. One such arrangement is shown in FIG. 4. The array elements 3a and 3b of the transducer element of the acoustic transducer 1 are connected in parallel during the analysis phase as well as during the operating phase. The electromechanical properties of the transducer elements of the acoustic transducers 1 and 2 are largely identical.

Using the arrangement shown in FIG. 4, it is also possible to only use array elements 3a and 4a or 3b and 4b for the signal transmission during the flow measurement. The transit times V1 and t2 required for the calibration can be measured between the array elements 3a and 4a or 3a and 4b or between 3b and 4a or 3b and 4b.

Other possible embodiments of the invention are achieved, as previously described, by increasing the number of array elements.

The measurement of the time difference delta_tc is only intended to measure the influence of the deviation of the wave front from parallelism to the receiving transducer element. However, if the fluid in the pipe is flowing, the transit time of the sound is also influenced by the flow. If the flow velocity is constant during the measurement of t1 and t2, the flow has no effect on the difference. However, in practice, this is never achieved in an ideal manner. In practice, the flow is mostly in a turbulent state. In this case, the flow velocity randomly fluctuates around a mean value. The influence of such random fluctuations in case of a constant mean value of the flow velocity can be eliminated by averaging several successive measured values of the time difference. However, if the mean value of the flow velocity is not constant, this procedure will not help. For example, a time-linear increase of the flow velocity results in that the flow velocity has a systematically greater influence on the transit time t1 than on the transit time t2. The pause times between the individual measurements should be kept as short as possible. This procedure can also be applied to the present invention. Obviously, the effect of the change of flow is smaller if the time intervals between the measurements of t1 and t2 are shorter.

Figure 6:
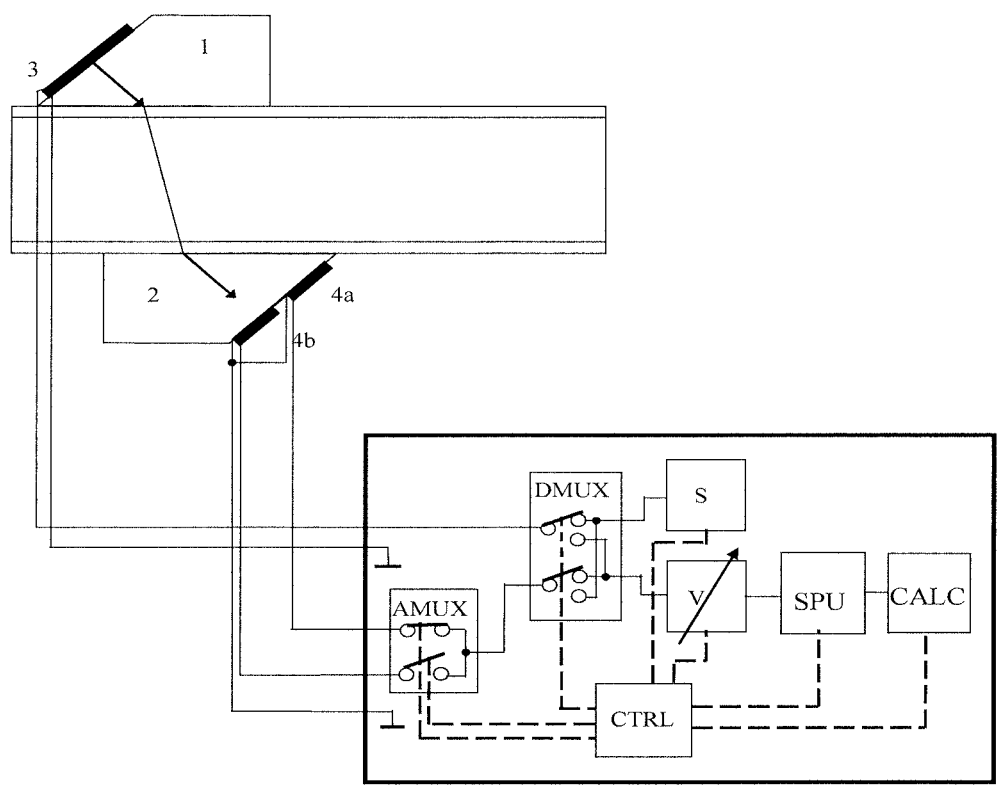

For the implementation of the described method, a device consisting of an emitting unit S, at least one array multiplexer AMUX, a direction switch DMUX, a receiving amplifier V, a processing unit SPU and a control unit CTRL and a calculation unit CALC is proposed (FIG. 6). The array multiplexer AMUX connects either the array element 4a or the array element 4b or both array elements to the receiving amplifier V. The control unit CTRL controls the direction switch DMUX and the array multiplexer AMUX as well as the processing unit SPU and the calculation unit CALC.

During the analysis phase, the direction switch DMUX is switched in such way that the emitting unit S is connected to the terminals of the acoustic transducer 1 and its corresponding transducer element, and the receiving amplifier V is connected to the array multiplexer AMUX. The array multiplexer AMUX is controlled in such way either only the array element 4a or the array element 4b of the acoustic transducer 2 is connected to the receiving amplifier V.

Figure 7:
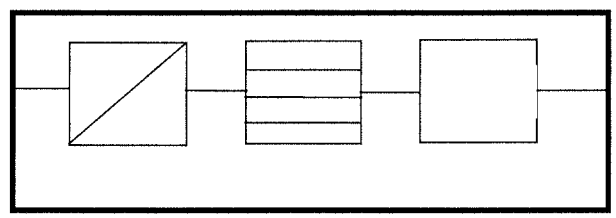

The processing unit SPU connected to the receiving amplifier V determines the time difference delta_tc to be measured. The processing unit SPU shown in FIG. 7 includes an analog-to-digital converter ADC, a buffer memory MEM and a correlator KORR. For the measurement of delta_tc, as a first step, the array element 4a is connected to the processing unit SPU via the array multiplexer AMUX and the receiving amplifier, and an emitted signal is generated by the emitting unit S. The received signal generated at the array element 4a is digitized by the analog-to-digital converter ADC in the processing unit SPU and stored in the buffer memory MEM. As a second step, the array multiplexer AMUX is switched by the control unit CTRL in such way that the array element 4b is connected to the processing unit SPU via the receiving amplifier V and another emitted signal is generated by the emitting unit S. The received signal generated at the array element 4b is digitized by the analog-to-digital converter ADC in the processing unit SPU and also stored in the buffer memory MEM. Using a digital cross correlator, the time difference delta_tc is directly determined from the received signals of the array elements 4a and 4b which have been digitized and stored in the buffer memory. This digital correlator KORR is realized using, for example, a programmable digital signal processor (DSP).

The calibration factor Kaf is calculated by the calculation unit CALC from the time difference delta_tc determined in the correlator according to Eq. 8 or Eq. 18.

Figure 8:
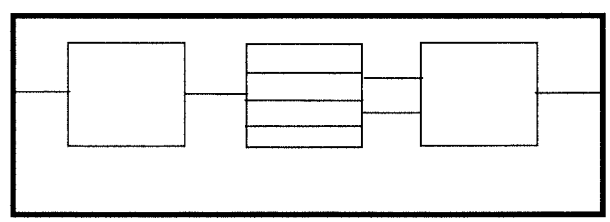

In another design variation (FIG. 8), the processing unit SPU includes a time measurement unit TDC with a very high resolution, e.g., a "time-to-digital converter", and a buffer memory MEM. With this design, the transit time t1 or t2 is measured directly without digitizing, using the corresponding received signal, and stored in the buffer memory MEM. After the two transit times t1 and t2 have been measured, their difference is calculated by the difference generator MINUS and transmitted to the calculation unit CALC to determine the calibration factor Kaf.

During the operating phase, the array multiplexer AMUX is switched by the control unit CTRL in such way that the array elements 4a and 4b are connected in parallel. The direction switch DMUX alternately operates the acoustic transducer 1 as an emitter and the acoustic transducer 2 as a receiver, and the acoustic transducer 2 as an emitter and the acoustic transducer 1 as a receiver. The processing unit SPU is now used to measure the transit time difference Δt caused by the flow and the transit time in the fluid t1, and uses them to calculate the flow rate according to Eq. 4 in the calculation unit CALC, where the transducer constant Ka is substituted by the calibration factor Kaf determined during the analysis phase.

Figure 9:
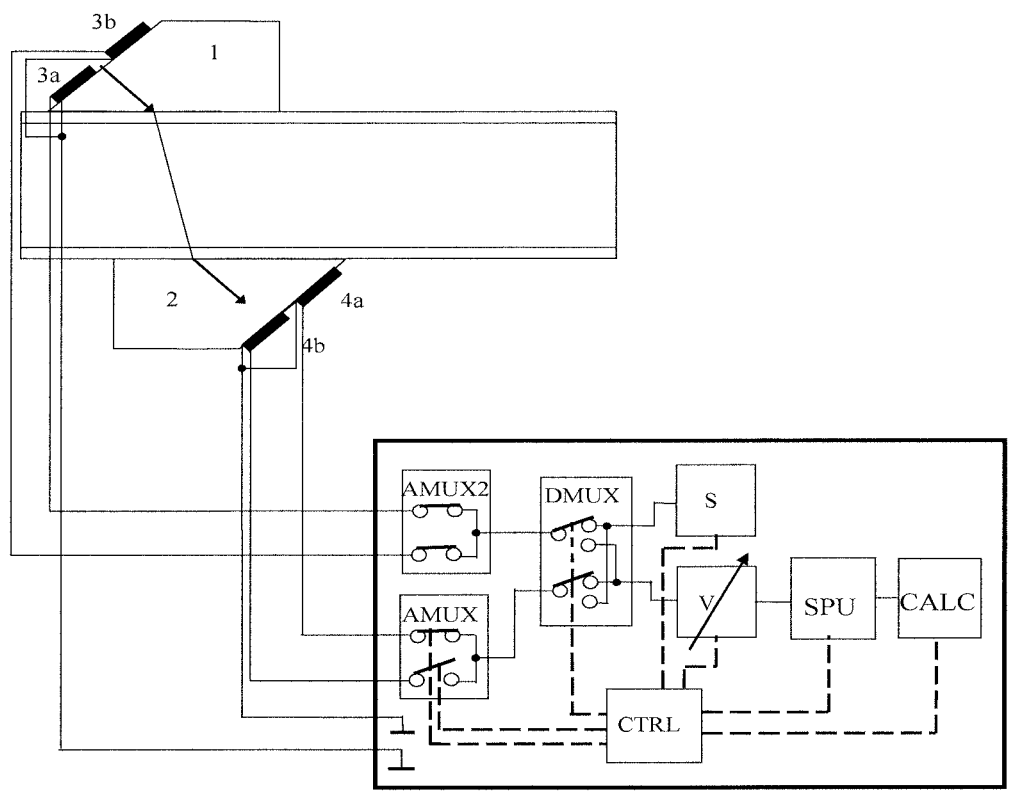

In another design variation (FIG. 9), the transducer element of the acoustic transducer 1 is also realized as an array and another array multiplexer AMUX2 is added between the terminals of the acoustic transducer 1 and the direction switch DMUX. During the operating phase, the two array multiplexers AMUX and AMUX2 are controlled in such way that the array elements 3a and 3b as well as the array elements 4a and 4b are connected in parallel. During the analysis phase, one of the array multiplexers is controlled in such way that the corresponding array elements are connected in parallel, while the other multiplexer realizes the subsequent connection of the array elements to the receiving amplifier V and the processing unit SPU.

In another design variation, at least one of the transducer elements 3 and 4 is made up of more than two array elements. In this case, the corresponding array multiplexer of the devices according to FIG. 6 and FIG. 9 contains as many inputs as array elements. During the analysis phase, the corresponding array multiplexer is controlled in such way that, as a first step, at least 2 non-adjacent array elements are connected in parallel and their received signal is processed. As a second step, the other and non-adjacent array elements are connected in parallel and their received signal is processed.

The invention claimed is:

1. Method of ultrasonic clamp-on flow measurement using two acoustic transducers with transducer elements installed on a measuring pipe, where at least one transducer element is comprised of at least two array elements, the method comprising, in an analysis phase carrying out the following steps:
a. measurement of a transit time t1 of an acoustic wave traveling between a transducer element of a first acoustic transducer and a first array element of a second acoustic transducer,
b. measurement of a transit time t2 of an acoustic wave traveling between the transducer element of the first acoustic transducer and a second array element of the second acoustic transducer, and
c. calculation of a time difference $\Delta tc$ between the transit times t1 and t2, and determining a calibration factor Kaf using the calculated time difference $\Delta tc$, and in a subsequent operating phase, using the calibration factor Kaf for measurement of a volumetric flow rate Q in order to compensate for the acoustic influence of the measuring pipe, wherein a position of the first array element of the second acoustic transducer is offset from a position of the second array element of the second acoustic transducer in a flow direction of fluid in the measuring pipe, and wherein:

a calculation of a path length difference $\Delta lc$ is carried out based on the time difference $\Delta tc$ multiplied by a known sound speed ca in a transducer wedge, resulting in an angle change of the angle of incidence $\Delta alpha$ with $\arcsin(\Delta lc/\Delta s)$, where $\Delta s$ is a distance between the first and second array elements, from which the calibration factor Kaf is calculated as $ca/\sin(alpha+\Delta alpha)$, or the calibration factor Kaf is calculated on the basis of the time difference $\Delta tc$ according to the equation $Kaf=Ka/(1+Ka*\cos(alpha)*\Delta tc/\Delta s)$, where Ka is the ratio of a sound speed ca in a transducer wedge and the sine of the angle of incidence alpha in the transducer wedge and $\Delta s$ is a distance between the first and second array elements, or the calibration factor Kaf is determined from the calculated time difference $\Delta tc$ using an approximation function $fc(\Delta tc)$ and the approximation function $fc(\Delta tc)$ is calculated from a number N of value pairs (Kaf_i, $\Delta tc\_i$), where the value pairs (Kaf_i, $\Delta tc\_i$) are obtained before the flow measurement by measuring Kaf_i and $\Delta tc\_i$ on each of a number N of pipes i, on which the acoustic transducers are installed for customary ultrasonic clamp-on flow measurement, where the measurement of Kaf_i is carried out by measuring the transit times tx1 and tx2, while the second acoustic transducer is located at the position x1 or x2, where the transit times are the transit times between a transducer element of the first acoustic transducer and a transducer element of the second acoustic transducer, where the points x1 and x2 lie symmetrically with respect to a point x0, and Kaf_i is calculated as $Kafxi=(x2-x1)/(tx2-tx1)$, and the measurement of $\Delta tc\_i$ is carried out according to steps a through c, while the second acoustic transducer (2) is located at the position x0.

2. Method of ultrasonic clamp-on flow measurement using two acoustic transducers with transducer elements installed on a measuring pipe, where at least one transducer element is comprised of at least two array elements, the method comprising, in an analysis phase, calculating a cross-correlation function of at least two received signals, where a first received signal is a signal emitted by the transducer element of a first acoustic transducer and received and digitized by a first array element of a second acoustic transducer, and a second received signal is a signal emitted by the transducer element of the first transducer and received and digitized by a second array element of the second acoustic transducer, calculating a temporal position of a maximum of the cross-correlation function, the temporal position being the time difference $\Delta tc$, and determining a calibration factor Kaf using a calculated time difference $\Delta tc$, and in a subsequent operating phase, using the calibration factor Kaf for measurement of a volumetric flow rate Q in order to compensate for the acoustic influence of the measuring pipe, wherein a position of the first array element of the second acoustic transducer is offset from a position of the second array element of the second acoustic transducer in a flow direction of fluid in the measuring pipe, and wherein:

a calculation of a path length difference $\Delta lc$ is carried out based on the time difference $\Delta tc$ multiplied by a known sound speed ca in a transducer wedge, resulting in an angle change of the angle of incidence $\Delta alpha$ with $\arcsin(\Delta lc/\Delta s)$, where $\Delta s$ is a distance between the first and second array elements, from which the calibration factor Kaf is calculated as $ca/\sin(alpha+\Delta alpha)$, or the calibration factor Kaf is calculated on the basis of the time difference $\Delta tc$ according to the equation $Kaf=Ka/(1+Ka*\cos(alpha)*\Delta tc/\Delta s)$, where Ka is the ratio of a sound speed ca in a transducer wedge and the sine of the angle of incidence alpha in the transducer wedge and $\Delta s$ is a distance between the first and second array elements, or the calibration factor Kaf is determined from the calculated time difference $\Delta tc$ using an approximation function $fc(\Delta tc)$ and the approximation function $fc(\Delta tc)$ is calculated from a number N of value pairs (Kaf_i, $\Delta tc\_i$), where the value pairs (Kaf_i, $\Delta tc\_i$) are obtained before the flow measurement by measuring Kaf_i and $\Delta tc\_i$ on each of a number N of pipes i, on which the acoustic transducers are installed for customary ultrasonic clamp-on flow measurement, where the measurement of Kaf_i is carried out by measuring the transit times tx1 and tx2, while the second acoustic transducer is located at the position x1 or x2, where the transit times are the transit times between a transducer element of the first acoustic transducer and a transducer element of the second acoustic transducer, where the points x1 and x2 lie symmetrically with respect to a point x0, and Kaf_i is calculated as $Kafxi=(x2-x1)/(tx2-tx1)$, and the measurement of $\Delta tc\_i$ is carried out while the second acoustic transducer (2) is located at the position x0.

3. Apparatus for a method of ultrasonic clamp-on flow measurement using first and second acoustic transducers with transducer elements, which are installed on a measuring pipe, where at least the second transducer element is comprised of at least first and second array elements, the apparatus comprising an emitting unit, at least one array multiplexer with at least two inputs, a direction switch, a receiving amplifier, a processing unit, a control unit, and a calculation unit, wherein either the first array element or the second array element or both array elements of the second acoustic transducer are connected to a channel of the direction switch via the array multiplexer, and a second channel of the direction switch is connected to the first transducer element, and the direction switch with two remaining terminals thereof is connected to the emitting unit and the receiving amplifier, and the receiving amplifier is connected to the processing unit, the processing unit configured to determine a time difference $\Delta t_c$ and transmits it to the calculation unit and the control unit is configured to control the direction switch and the array multiplexer as well as the receiving amplifier, the processing unit and the calculation unit, in order to realize an analysis phase as well as an operating phase using the same first and second acoustic transducers without changing position thereof on the measuring pipe, where during the analysis phase the direction switch is configured to be switched so that the emitting unit is connected to terminals of the first acoustic transducer and the transducer element thereof, and the receiving amplifier is connected to the array multiplexer, and the array multiplexer is configured to be controlled so that either only the first array element or the second array element of the second transducer element is connected to the receiving amplifier, and during the operating phase the array multiplexer is configured to be switched by the control unit so that the array elements of the second transducer are connected in parallel.

4. The apparatus according to claim 3, wherein the processing unit is comprised of an analog-to-digital converter, a buffer memory and a digital correlator.

5. The apparatus according to claim 4, wherein the correlator comprises a digital signal processor.

6. The apparatus according to claim 3, wherein the processing unit comprises a time measuring unit, a buffer memory and a difference generator.

7. The apparatus according to anyone of claims 3 to 6 in that, wherein the first transducer element is comprised of at least two array elements and the array multiplexer connects either the first array element or the second array element or both array elements of the first transducer element with a channel of the direction switch.

* * * * *